Dec. 1, 1925.
C. F. LAVALLEE
1,564,003
VEHICLE SPRING CHECK SHOCK ABSORBER
Filed Oct. 31, 1924
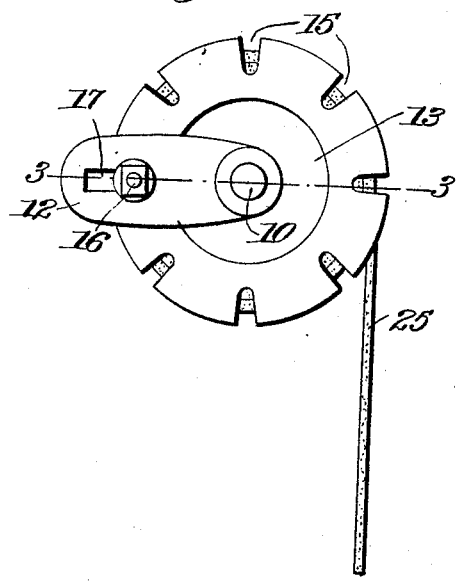
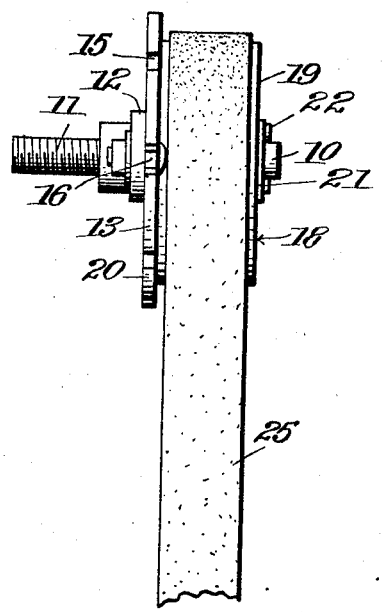
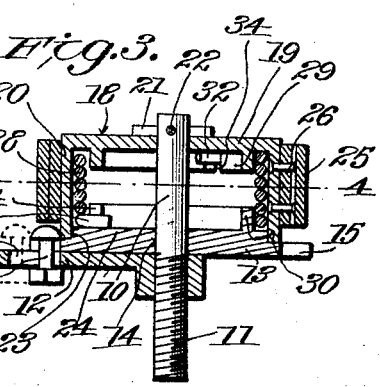
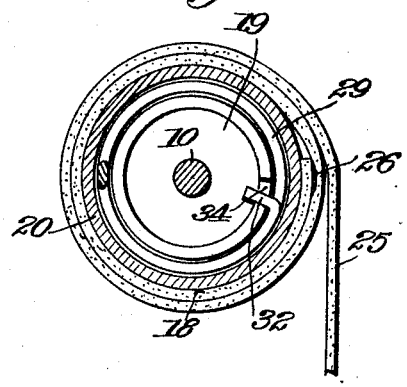
Inventor
Chas. F. Lavallee
By Frank Fuller
Attorney Patented Dec. 1, 1925.

1,564,003

UNITED STATES PATENT OFFICE.

CHARLES F. LAVALLEE, OF NEWMARKET, NEW HAMPSHIRE.

VEHICLE SPRING CHECK SHOCK ABSORBER.

Application filed October 31, 1924. Serial No. 747,050.

*To all whom it may concern:*

Be it known that CHARLES F. LAVALLEE, a citizen of the United States, residing at Newmarket, in the county of Rockingham and State of New Hampshire, has invented certain new and useful Improvements in Vehicle Spring Check Shock Absorbers, of which the following is a specification.

This invention relates to spring check shock absorbers for use on vehicles, usually automobiles, to provide for easier riding.

A prime object is to provide a device mainly operable when the vehicle spring loosens so as to equalize the strain between the vehicle spring and the check so that the device will operate opposite to a snubber.

An important object is to provide a construction wherein the parts are readily regulable and adjustable to prevent a too high upheaval spring action.

It is further aimed to provide the particular construction hereinafter described and illustrated in accompanying drawings, from a consideration of which various additional objects and advantages will become apparent.

In said drawings;—

Figure 1 is a side elevation of the device,

Figure 2 is an elevation of the device taken at right angle to Figure 1,

Figure 3 is a diametric sectional view taken on line 3—3 of Figure 1, and

Figure 4 is a sectional view taken on the line 4—4 of Figure 3.

Referring specifically to the drawings, 10 designates a stud which is provided with a screw-thread 11, by means of which it is adapted for rigid attachment to the frame of an automobile or the like. Screw-threaded to the threads 11 is an arm 12, usually screwed to the limit on the stud so as to be turned unitarily therewith. A head or plate 13 has an opening 14 through which the stud loosely passes. This plate has marginal notches as at 15, adapted for engagement by a detachable bolt or like fastening, as at 16. Said bolt 16 passes through an elongated slot 17 in the arm and the bolt is selectively engageable with either of the notches 15. It is to be noted that the slot 17 extends outwardly of the periphery of the plate 13, and hence when the bolt is being shifted from one notch to another, it may be moved to the dotted line position suggested in Figure 3, thus avoiding the necessity of completely detaching the bolt or equivalent fastening incidental to adjustment of the parts.

A drum 18 is provided which has a closed end or disk 19, from which peripheral or annular wall 20 constituting the drum proper, extends. Wall 19 is journaled on the stud 10 and the drum is held in place on the stud by a washer as at 21 and a cotter key 22 passed through an opening in the stud, or equivalent means. This inner surface of the free end of wall 20 has bearing contact at 23 with an enlargement 24 of the plate 13.

A leather, cloth, composition or other flexible check-strap 25 is provided, being fastened at one end as at 26, in any suitable manner, to the drum and at its other end (not shown) to a suitable part of the vehicle, usually an axle or its housing. Strap 25 is coiled or trained about the wall 20 in any appropriate manner.

Disposed within the device is a coil or torsional spring 28. Extending inwardly from the plate 13 and wall 19 are annular positioning flanges 29 and 30, in order that the plate 13 and drum 18 will be operatively connected with the spring and the spring will urge winding movement of the drum so as to take up slack in the strap 25 and check its action and operation.

In use, it will be realized that the stud 11 is rigidly fastened in any suitable manner to the frame of the vehicle, for instance one of the side beams of the chassis and has one end of the strap 25 fastened to the drum while its other end is usually fastened to the housing of the rear axle. With the parts thus disposed, and bolt 16 moved to the dotted line position of Figure 3, the drum may be turned or rotated so as to take up slack in strap 25, and so as to appropriately tension it, after which the bolt 16 is moved into the adjacent notch 15, that is the notch in registry with slot 17, and thereupon fastened. Thus connected, the device will serve as a shock absorber working oppositely to a snubber, and particularly when the vehicle springs loosen or flatten so as to equalize the strain between the springs and check, and prevent too sudden upheaval or spring action, thus preventing undue jolts, jars and plunges to the vehicle occupants.

I claim:—

1. A device of the class described comprising a stud, a plate movable turnably on said stud, an arm on said stud, said plate having a plurality of slots, means carried by said arm selectively engageable in said slots to secure the plate in different adjusted positions, a drum movable with respect to the plate, a check member extending from the drum, and a check spring operatively associated with said plate and drum.

2. A device of the class described comprising a plate, a mounting means, an arm extending from said means provided with a slot, a plate turnable with respect to said means, said plate having marginal notches individually registrable with said slot, said slot extending outwardly of the margin of said plate, a fastening element occupying the said slot and selectively engageable in said notches, said element being disposable outwardly of the plate whereby the latter may be turned while the element is fastened to the arm, a drum, a check spring associated with said drum and plate, and a check strap extending from the drum.

3. A device of the class described comprising a plate provided with marginal notches, a stud on which said plate is adapted to turn, said stud having a screw-threaded portion for rigid attachment to a support, an arm screw-threaded on said portion, said arm having a slot, a fastening element disposed in said slot and selectively engageable with said notches, said slot being elongated in a direction to permit said bolt to be disposed outwardly of the plate without detachment from the arm, said plate having an enlargement, a drum having an end wall journaled on said stud, an annular wall extending from said end wall and journaled on said enlargement, means to prevent displacement of the drum from the stud, flanges integral with said plate and with said end wall, a torsional spring disposed between said flanges and said annular wall, said spring at its terminals being respectively fastened to said flanges, and a check strap associated with said annular wall.

In testimony whereof I affix my signature.

CHARLES F. LAVALLEE.